(12) United States Patent
Ahmadi et al.

(10) Patent No.: US 12,229,105 B2
(45) Date of Patent: Feb. 18, 2025

(54) INDEXING ELEMENTS IN A SOURCE ARRAY

(71) Applicant: Imagination Technologies Limited, Kings Langley (GB)

(72) Inventors: Aria Ahmadi, Hertfordshire (GB); Cagatay Dikici, Hertfordshire (GB)

(73) Assignee: Imagination Technologies Limited, Kings Langley (GB)

( * ) Notice: Subject to any disclaimer, the term of this patent is extended or adjusted under 35 U.S.C. 154(b) by 51 days.

(21) Appl. No.: 17/321,091

(22) Filed: May 14, 2021

(65) Prior Publication Data
US 2022/0012222 A1    Jan. 13, 2022

(30) Foreign Application Priority Data
May 14, 2020    (GB) ..................................... 2007115

(51) Int. Cl.
*G06F 16/22*    (2019.01)
*G06F 17/11*    (2006.01)

(52) U.S. Cl.
CPC .......... *G06F 16/2264* (2019.01); *G06F 17/11* (2013.01)

(58) Field of Classification Search
CPC .............................. G06F 16/2264; G06F 17/11
See application file for complete search history.

(56) References Cited

U.S. PATENT DOCUMENTS

| | | | | |
|---|---|---|---|---|
| 10,719,576 B2 * | 7/2020 | Fenney | .................. | G06F 17/175 |
| 2009/0307657 A1 * | 12/2009 | Farrugia | ............. | G06F 21/6218 |
| | | | | 717/110 |
| 2013/0326160 A1 | 12/2013 | Sperber et al. | | |
| 2016/0062948 A1 | 3/2016 | Fenney | | |
| 2016/0092166 A1 | 3/2016 | Gschwind | | |
| 2016/0092228 A1 * | 3/2016 | Gschwind | ........... | G06F 9/30134 |
| | | | | 711/110 |
| 2018/0081685 A1 | 3/2018 | Bhuiyan et al. | | |
| 2020/0014404 A1 * | 1/2020 | Mendel | .................. | H04L 9/003 |
| 2020/0057755 A1 * | 2/2020 | Veeningen | .............. | G06F 21/79 |
| 2020/0342288 A1 * | 10/2020 | Xi | ........................ | G06N 3/0445 |

(Continued)

FOREIGN PATENT DOCUMENTS

| | | |
|---|---|---|
| EP | 3125144 A1 | 2/2017 |
| GB | 2277012 A | 10/1994 |

(Continued)

OTHER PUBLICATIONS

Jaderberg et al., "Spatial Transformer Networks", Advances in Neural Information Processing Systems 28 (NIPS 2015).

(Continued)

*Primary Examiner* — Mark D Featherstone
*Assistant Examiner* — Ranjit P Doraiswamy
(74) *Attorney, Agent, or Firm* — Potomac Law Group, PLLC; Vincent M DeLuca

(57) ABSTRACT

A hardware-implemented method of indexing data elements in a source array is provided. The method comprises generating a number of shifted copy arrays; receiving indices for indexing the source array; and retrieving one or more data elements from the shifted copy arrays, according to the received indices. Also disclosed is a related processing system comprising a memory and hardware for indexing data elements in a source array in the memory.

17 Claims, 8 Drawing Sheets

(56) References Cited

U.S. PATENT DOCUMENTS

2021/0201107 A1\* 7/2021 Laszlo ................ G06N 3/0454

FOREIGN PATENT DOCUMENTS

GB 2574372 A 12/2019
JP 3683281 B2 \* 8/2005 ........... G06F 8/4442

OTHER PUBLICATIONS

Force et al; "Visual Basic.NET programming technology"; China Railway Press Co., Ltd.; http://www.tdpress.com/5leds/; 2019; 24 pages.
Kernighan et al; "The C Programming Language"; Prentice Hall Software Series; Jan. 2, 1988; 288 pages.
Anonymous; "Memory—how to do acircular shift for an array via verilog—Stack Overflow"; URL:http%3A%2F%2Fweb.archive.org%2Fweb%2F20200229210733%2Fhttps%3A %2F%2Fstackoverflow .com%2Fquestions%2F60457633%2Fhow-to-do-acircular-shift-for-an-array-via-verilog; 2 pages.
Walsh et al; "A compact FPGA implementation of a bit-serial SIMID cellular processor array"; Aug. 29, 2012; pp. 1-6.

\* cited by examiner

INDEXING ELEMENTS IN A SOURCE ARRAY

BACKGROUND

Indexing data elements in an array is a ubiquitous task in the operation of computing hardware. It is a key enabling process for interpolation operations, for example.

In general, the array of data elements to be indexed is stored in a memory. In order to retrieve a particular desired data element from the array, the index of the desired data element is typically used to calculate a memory address, and the data element is then retrieved by accessing the calculated memory address. The need to calculate the memory address imposes a computational burden.

Calculating addresses for large numbers of arbitrary indices may be inefficient—especially for certain types of hardware. However, until now, there was no other alternative.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A hardware-implemented method of indexing data elements in a source array is provided. The method comprises generating a number of shifted copy arrays; receiving indices for indexing the source array; and retrieving one or more data elements from the shifted copy arrays, according to the received indices. Also disclosed is a related processing system comprising a memory and hardware for indexing data elements in a source array in the memory.

According to one aspect, there is provided a hardware-implemented method of indexing data elements in a source array in a memory, the method comprising:

generating a number of shifted copy arrays based on the source array, each shifted copy array comprising the data elements of the source array at a respective shifted position;

receiving a plurality of indices for indexing the source array, each index of the plurality of indices indicating a target location in the source array; and for each index of the plurality of indices:

retrieving one or more data elements from respective one or more shifted copy arrays, wherein the one or more shifted copy arrays are selected according to the index.

For each index, the one or more data elements retrieved may include data elements of the source array that are in a finite neighbourhood around the target location. Such data elements will be denoted "neighbourhood data elements". In some embodiments, the neighbourhood data elements may be the data elements that lie nearest to the target location in one or more dimensions of the source array (for example, the data elements left/right/above/below, relative to the target location). In other examples, the neighbourhood may be more extensive, and may include a larger portion of the array, around the target location.

In some embodiments, the neighbourhood may coincide with the extent of a sampling/interpolation kernel that is used to generate a data value at the target location.

In general, retrieving arbitrary elements from an array can be an inefficient task—particularly when implemented using certain types of hardware. The present method substitutes the task of indexing the single source array with an expansion of the data into multiple shifted versions, followed by accessing the (one or more) shifted versions that correspond to each desired index. This approach can provide performance gains over a conventional "direct" indexing approach, in certain circumstances. For example, it can be particularly beneficial when there is a need to access many data elements at varying positional offsets, where the positional offsets lie within a finite range. It may also be better suited for implementation on certain types of hardware—for instance, hardware that is adapted for implementing neural networks.

Since each shifted copy array relates to a respective shifted position of the source array, the number of shifted copy arrays is equal to the number of shifted positions considered. The shifted positions may include shifts in one, two, or more dimensions. The shifts may be integer shifts. If the shifts consist of shifts of +1 and −1, in one dimension, for example, then there are two shifted copy arrays. If the shifts consist of all combinations of shifts between +1 and −1 in two dimensions, for example, then there are eight shifted copy arrays, corresponding to (x, y) shifts of (+1, 0), (+1, +1), (0, +1), (−1, +1), (−1, 0), (−1, −1), (0, −1), and (+1, −1). Here, it is understood that the "shift" (0, 0) is the source array.

One data element is retrieved from each shifted copy array accessed (whether one shifted copy array or more than one shifted copy array is accessed).

In some embodiments, the method may comprise outputting the one or more retrieved data elements. In some embodiments, the method may comprise outputting values interpolated from the one or more retrieved data elements.

Generating the shifted copy arrays may comprise convolving the source array with a set of filter kernels, each filter kernel generating a respective one of the shifted copy arrays. The filter kernels may be sparse filter kernels. Each sparse filter kernel may comprise a delta function, consisting of a plurality of zero-valued filter coefficients and a single nonzero filter coefficient. The nonzero coefficient may be equal to 1.

For each index of the plurality of indices, retrieving the respective one or more data elements may comprise retrieving a data element from each of the shifted copy arrays, the method optionally further comprising gating the retrieved elements based on the index, to thereby select a data element and/or generate an interpolated data element.

Gating the retrieved elements may comprise defining a gating coefficient for each of the retrieved elements, wherein the gating coefficients for data elements other than neighbourhood data elements in a finite neighbourhood around the target location are zero. The gating may comprise multiplying the retrieved data elements by their respective gating coefficients, and summing the results. Since the gating coefficients for data elements other than the neighbourhood data elements are zero, this will result in multiplication by zero. The result of multiplication by zero is always zero. This can be exploited to increase efficiency, in some hardware implementations. A zero-valued multiplicand (and/or multiplier) can be detected and, in response, the multiplication operation can be suppressed. The output of the multiplication is set to zero without needing to perform the actual calculation. This can lead to energy savings.

Defining the gating coefficients may comprise calculating the gating coefficients, wherein the calculating comprises a linear summation, followed by a nonlinear activation function. This mirrors the processes in a neural network and is particularly well suited for implementation on neural network accelerator hardware. The linear summation may be a weighted linear summation. When used for interpolation and/or (re)sampling, calculating the gating coefficients in this way can allow convenient implementation of a sampling or interpolation kernel. The gating can implement both the selection of the relevant data elements and the weighting of those data elements according to the kernel.

Calculating the gating coefficients may comprise, for an index $x \in \mathbb{R}^1$ of the plurality of indices, in one dimension: a first summation of the form $y=x+b$, $b \in \mathbb{R}^s$, where $b=[n, n-1, \ldots, 0, \ldots, -n]$, $$n = \left\lceil \frac{S-1}{2} \right\rceil$$

where S is the number of shifts in the one dimension; defining an activation function, which returns the value input to it, if that input value is between 0 and 1, and otherwise returns 0; a first operation of the activation function, with the input $(y+1)$, giving an output $y_1$; a second operation of the activation function, with the input $(y)$, giving an output $y_2$; and a second summation, operating on at least one value of $y_2$, which returns $z_2 = w_2 y_2 + b_2$, where $w_2 = -1$ and $b_2 = 1$, wherein the gating coefficients are based on the result $y_1$ of the first operation of the activation function and the result $z_2$ of the second summation.

Here x is a scalar value, and b is a vector. Therefore, the first summation may be implemented using element-wise addition. The second summation could in principle also be implemented by element-wise addition; however, since only one element of $y_2$ is nonzero, the task can be reduced to a scalar summation.

The nonzero value of $y_1$ may at least partially define the gating coefficient for at least one data element, and the value of $z_2$ for which $y_2$ is nonzero may at least partially define the gating coefficient for at least one other data element. Any other gating coefficients are zero.

As summarised above, the gating may comprise multiplying the shifted data elements by their respective the gating coefficients, and summing the results. When the shifts are one-dimensional, the nonzero value of $y_1$ may define the gating coefficient for one data element, and the value of $z_2$ for which $y_2$ is nonzero may define the gating coefficient for another data element.

The above-summarised way of calculating the gating coefficients can enable the gating coefficients to implement bilinear interpolation. By formulating the calculation as a combination of linear summations and nonlinear activation functions, the method is suited to implementation on neural network accelerator hardware. Other formulations of the gating coefficients can be designed, which will implement other forms of interpolation, such as bicubic interpolation.

The shifted positions may comprise shifted positions in multiple dimensions and each index may be an index $x \in \mathbb{R}^N$ in respective multiple dimensions, and calculating the gating coefficients optionally comprises repeating the calculation summarised above for each dimension of the multiple dimensions, and calculating an outer product of the results. This can enable the gating coefficients to implement bilinear interpolation in two or more dimensions. Again, other formulations of the gating coefficients can allow other forms of interpolation (such as bicubic interpolation) to be carried out in two or more dimensions.

The gating coefficient for at least one of the target data elements may be a floating point value. That is, the gating coefficient does not need to be an integer.

The plurality of indices may include floating point indices. In other words, an index can be a nonintegral value.

The method may comprise interpolating between data elements of the source array, wherein the method of indexing is used to retrieve data elements for the interpolating. The interpolating may comprise linear or bilinear interpolation, or bicubic interpolation.

A method as summarised above may be used in a method of warping an image or feature map based on a motion vector field. This may be particularly useful when the array comprises an image or a feature map, for example. The motion vector field may comprise a plurality of motion vectors, for example in two dimensions. The plurality of indices may comprise, consist of, or be otherwise based on the plurality of motion vectors.

The method may be implemented by hardware logic adapted to implement a neural network. The hardware logic may be part of a neural network accelerator device, for example. It may comprise first logic specially adapted to perform weighted linear summations. It may comprise second logic specially adapted to implement nonlinear activation functions.

Also provided is a processing system comprising a memory and hardware for indexing data elements in a source array in the memory, the system comprising:
  a shift-generator block, configured to generate a number of shifted copy arrays based on the source array, each shifted copy array comprising the data elements of the source array at a respective shifted position; and
  an indexing block, configured to receive a plurality of indices for indexing the source array, each index of the plurality of indices indicating a target position in the source array; and
  for each index of the plurality of indices:
    retrieve one or more data elements from respective one or more shifted copy arrays, wherein the one or more shifted copy arrays are selected according to the index.

The shift-generator block may comprise a plurality of digital filters, wherein each digital filter is configured to generate a respective one of the shifted copy arrays, by convolving the source array with a respective filter kernel.

The indexing block may be configured to retrieve a data element from each of the shifted copy arrays, and the indexing block may comprise a gating unit, configured to gate the retrieved elements to thereby select a data element and/or generate an interpolated data element.

Also provided is a processing system configured to perform a method as summarised above.

The processing system may be embodied in hardware on an integrated circuit. The processing system may be a graphics processing system. Alternatively, it may be a neural network accelerator system.

A method of manufacturing, using an integrated circuit manufacturing system, a processing system as disclosed herein.

Also provided is a method of manufacturing, using an integrated circuit manufacturing system, a processing system as summarised above, the method comprising:
  processing, using a layout processing system, a computer readable description of the processing system so as to generate a circuit layout description of an integrated circuit embodying the processing system; and manufacturing, using an integrated circuit generation system, the processing system according to the circuit layout description.

Also provided is computer readable code configured to cause a method as summarised above to be performed when the code is run. Also provided is a computer readable storage medium having encoded thereon the computer readable code.

According to another example, there is provided an integrated circuit definition dataset that, when processed in an integrated circuit manufacturing system, configures the integrated circuit manufacturing system to manufacture a processing system as summarised above.

Also provided is a non-transitory computer readable storage medium having stored thereon a computer readable description of a processing system as summarised above, which, when processed in an integrated circuit manufacturing system, causes the integrated circuit manufacturing system to manufacture an integrated circuit embodying the processing system.

Still further provided is a non-transitory computer readable storage medium having stored thereon a computer readable description of a processing system as summarised above, which, when processed in an integrated circuit manufacturing system, causes the integrated circuit manufacturing system to:
process, using a layout processing system, the computer readable description of the processing system so as to generate a circuit layout description of an integrated circuit embodying the processing system; and
manufacture, using an integrated circuit generation system, the graphics processing system according to the circuit layout description.

There is also provided an integrated circuit manufacturing system configured to manufacture a processing system as summarised above.

Also provided is an integrated circuit manufacturing system comprising: a non-transitory computer readable storage medium having stored thereon a computer readable description of a processing system as summarised above; a layout processing system configured to process the computer readable description so as to generate a circuit layout description of an integrated circuit embodying the processing system; and
an integrated circuit generation system configured to manufacture the processing system according to the circuit layout description,
wherein the processing system comprises:
a memory, for storing a source array of data elements;
a shift-generator block, configured to generate a number of shifted copy arrays based on the source array, each shifted copy array comprising the data elements of the source array at a respective shifted position, whereby the number of shifted copy arrays is equal to the number of shifted positions; and
an indexing block, configured to receive a plurality of indices for indexing the source array, each index of the plurality of indices indicating a target position in the source array; and
configured to, for each index of the plurality of indices:
access one or more of the shifted copy arrays according to the index, and
retrieve one or more target data elements from the respective one or more shifted copy arrays.

The layout processing system may be configured to determine positional information for logical components of a circuit derived from the integrated circuit description so as to generate a circuit layout description of an integrated circuit embodying the processing system.

There may be provided computer program code for performing any of the methods described herein. There may be provided non-transitory computer readable storage medium having stored thereon computer readable instructions that, when executed at a computer system, cause the computer system to perform any of the methods described herein.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which.

Figure 1:
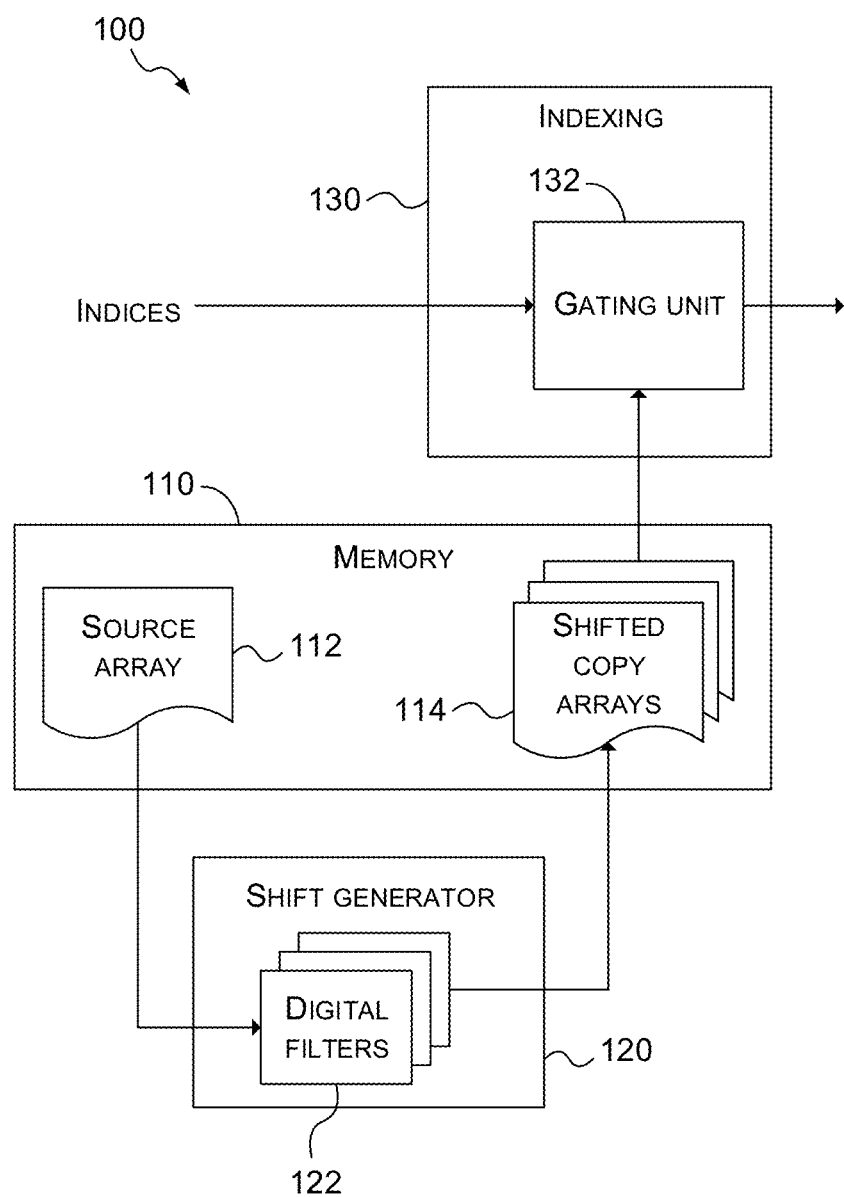
FIG. 1 shows a block diagram of a processing system according to an example, comprising hardware for indexing data elements in a source array.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art.

Embodiments will now be described by way of example only.

Definition: interpolation, as used herein, refers to an estimation method, which comprises constructing new data points within the range of a discrete set of known data points.

The present inventors have recognized that interpolation—and, in particular, dense interpolation—can be an inefficient and computationally intensive task, despite its ubiquity. The problem may be particularly severe for hardware that is optimized to implement machine-learning algorithms, such as a Neural Network Accelerator (NNA). Such hardware is typically not well-suited to calculating offsets in an array and retrieving arbitrary desired data elements from that array in memory.

FIG. 1 is a block diagram of a processing system 100 according to an example. The processing system comprises a memory 110, which stores the source array 112 to be indexed. The system also includes hardware for indexing the data elements of the source array, this hardware comprising a shift generator block 120 and an indexing block 130. The shift generator block 120 comprises a set of digital filters 122. The indexing block 130 comprises a gating unit 132.

Figure 2:
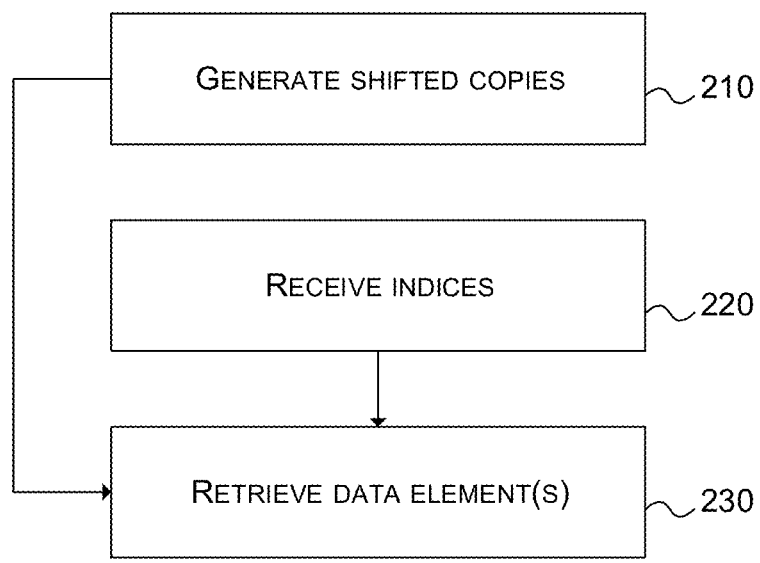
FIG. 2 is a flowchart illustrating a method of indexing data elements.

FIG. 2 is a flowchart illustrating a method performed by the processing system 100 of FIG. 1, according to an example. In step 210, the shift generator block 120 generates, based on the source array 112, a number of shifted copy arrays 114. Each shifted copy array 114 comprises the data elements of the source array at a respective shifted position. The shifted copy arrays are output by the shift generator block 120 to the memory 110.

In this example, the shifted copy arrays 114 are generated by the digital filters 122. Each digital filter is configured to convolve the source array 112 with a sparse filter kernel, to generate a respective one of the shifted copy arrays 114. For instance, taking a simple example of a one-dimensional array, the sparse filter kernel [1 0 0] will shift the data elements of the source array one place to the right. The sparse filter kernel [0 0 1] shifts the data elements one place to the left. It will be understood that it is not essential to generate the shifted copy arrays by means of digital filtering; however, it can be advantageous to implement the operation in this way—in particular, when using hardware that is optimized for performing inner product and/or digital filtering operations efficiently. This may include accelerator hardware such as Graphics Processing Units (GPUs) or NNAs.

In step 220, the indexing block 130 receives a plurality of indices for indexing the source array. Each index indicates a target position in the source array. Note that, in general, the indices may indicate integer or non-integer target positions in the array. However, for the present example, only, it will be assumed that the indices are integers. In step, 230, for each index of the plurality of indices, the indexing block retrieves at least one data element from one of the shifted copy arrays. The shifted copy array from which the data element is retrieved is selected according to the index.

In this example, instead of calculating the memory location corresponding to each target location in the original source array, the processing system instead retrieves the desired data element(s) from the appropriate shifted copy array. Essentially, the task of indexing into the source array is replaced with the task of selecting which of the shifted copy arrays contains the desired data elements. This approach may lend itself, in particular, to applications in which large numbers of indexing operations need to be carried out. For instance, in some applications, it may be necessary to produce a dense output array, with each element of the output array being derived from elements located in a finite distance away in the source array. This is the case for resampling, interpolation, and warping operations, among others.

The task of selecting which data element(s) to retrieve—that is, selecting the shifted copy array(s) from which to retrieve data element(s)—can be performed in several ways.

In some examples, the indexing block 130 may selectively access the shifted copy arrays 114, to retrieve only the data elements of interest. However, in many cases, it may be more efficient to access all of the shifted copy arrays 114, and retrieve a data element from each shifted copy array. These retrieved data elements are then gated by gating unit 132, to select those that are relevant and ignore those that are not. When the indices are integer-valued, as in the example of FIG. 2, the task of the gating unit is to select one unique data element, corresponding to each index, and to reject the retrieved data elements originating from other shifted copy arrays. This may be achieved, for example by multiplying the desired data elements by a value equal to 1, multiplying the other elements by a value equal to 0, and summing the results. That is, the gating unit 132 may implement an inner product calculation, with gating coefficients that are either 0 or 1. Such product calculations can often be implemented very efficiently in hardware—for example, in the case of a GPU or NNA.

In cases in which the indices are not integer-valued (in particular, if the indices are floating point values) the gating unit 132 can be employed to particular benefit. Non-integer indices mean that the processing system needs to estimate a data value lying in between the discrete data elements in the source array. In other words, some form of interpolation is required. In these circumstances, the gating unit 132 can be used to both select the relevant retrieved data elements to be used in the interpolation, and then also to carry out the calculations necessary for the interpolation. Such an example will now be described with reference to FIGS. 1A and 3.

Figure 1A:
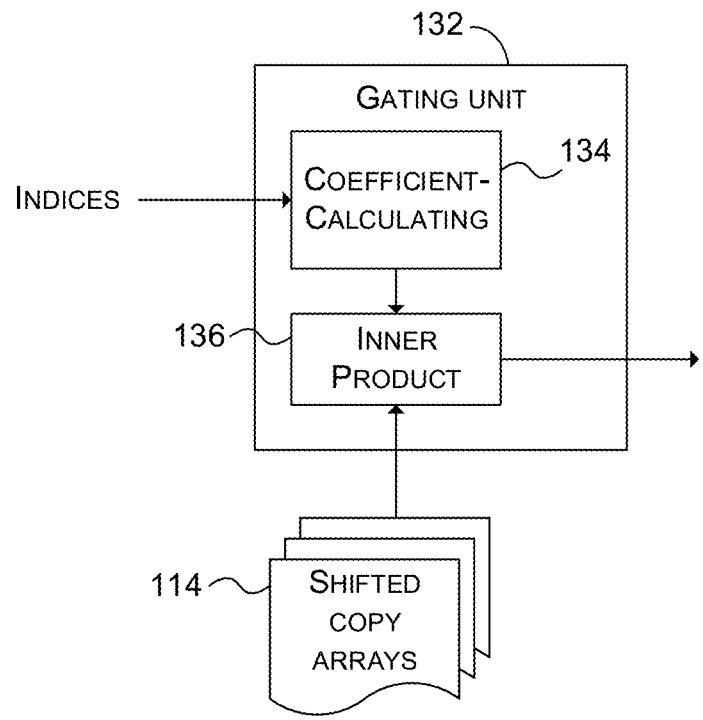
FIG. 1A illustrates the gating unit of FIG. 1 in greater detail.

FIG. 1A is a block diagram of the gating unit 132. As shown, the gating unit comprises a coefficient-calculating block 134, configured to calculate the gating coefficients; and an inner product block 136, configured to calculate an inner product of the gating coefficients with the data elements retrieved from the shifted copy arrays 114.

Figure 3:
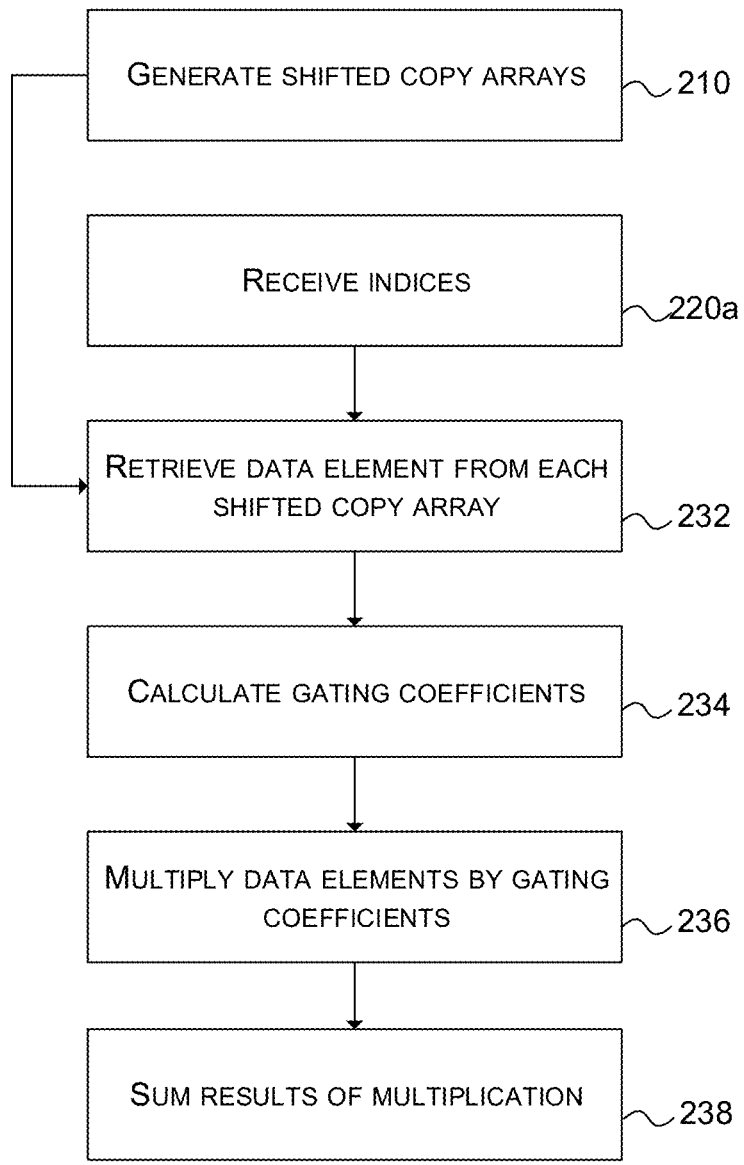
FIG. 3 illustrates a method of indexing data elements according to another example.

Step 210 in FIG. 3 (generating the shifted copy arrays) is the same as step 210 in FIG. 2. Step 220a in FIG. 3 (receiving the indices) is the same as step 220 in FIG. 2, except that the indices received are floating-point values. In step 232, the indexing unit 130 retrieves a data element from each of the shifted copy arrays. In step 234, the gating unit 132 calculates the gating coefficients. This is done by coefficient-calculating block 134. In step 236, each retrieved data element is multiplied by a respective gating coefficient; and in step 238 the results of these multiplications are summed. Steps 236 and 238 are carried out by the inner product block 136.

By appropriate calculation of the gating coefficients, the processing system can implement interpolation of a variety of different kinds. A detailed description will be provided below for an example in which the gating coefficients are calculated so as to implement bilinear interpolation. However, the gating coefficients can implement nearest-neighbour interpolation, bicubic interpolation, or any other type of interpolation.

Figure 4:
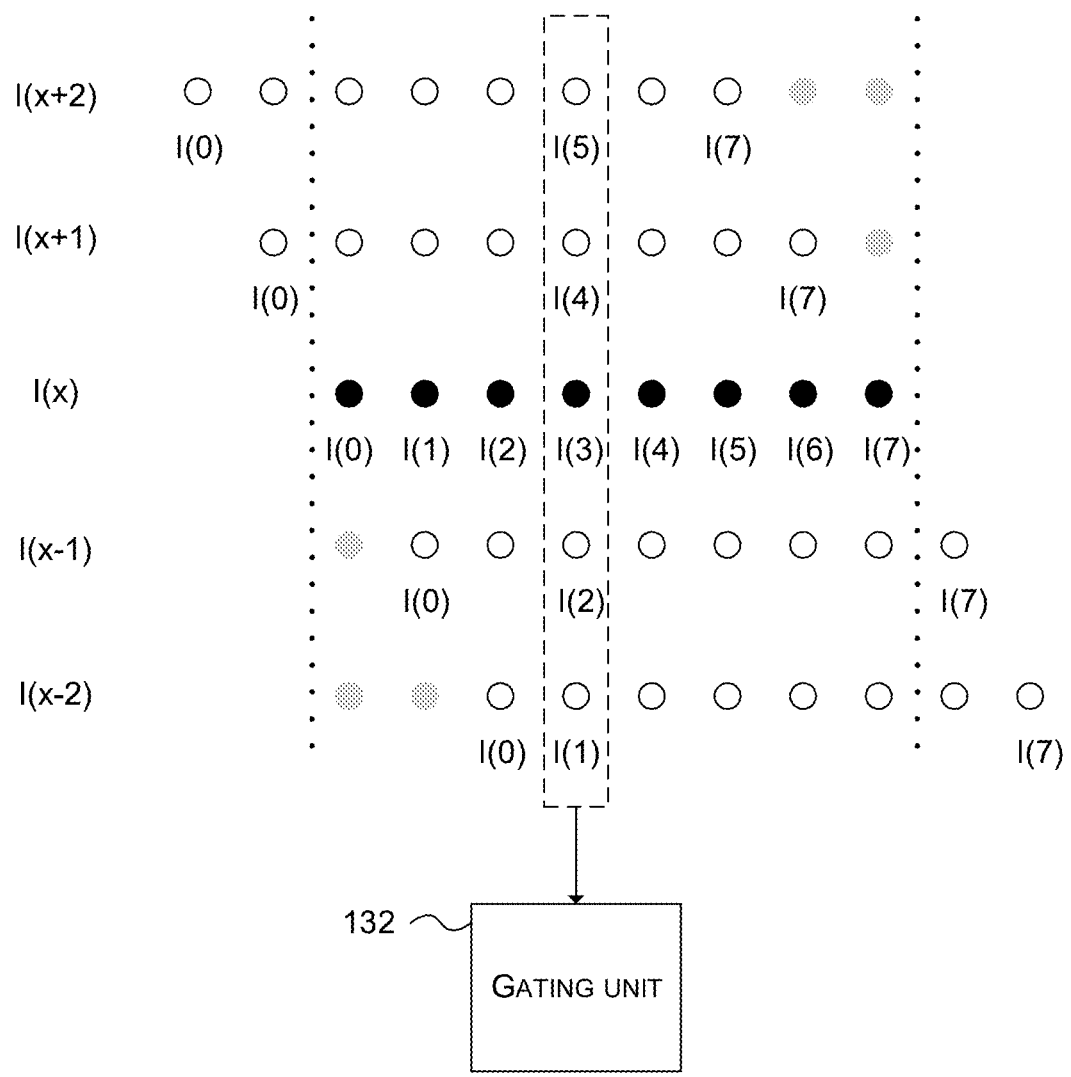
FIG. 4 illustrates the principle of operation of an indexing method according to an example.

The principle of operation of the processing system 100 can be explained with reference to FIG. 4. This illustrates schematically the source array and the shifted copy arrays for a simplified one-dimensional example, in which four shifted copy arrays are generated and used in the indexing method. The solid black circles represent the eight data elements $I(0) \ldots I(7)$ of the source array $I(x)$. The unshaded circles represent the shifted copy arrays. $I(x-1)$ denotes a shifted copy array with the data elements of the source array shifted one place to the right. Likewise, $I(x+1)$ denotes the shifted copy array with the data elements of the source array shifted one place to the left, and so on. The extent of the shifted copy arrays is indicated by the vertical dotted lines in FIG. 4. Data elements that are shifted outside this range are discarded, in the present example. Accordingly, in each shifted copy array, at least one data element is discarded from either the left or the right end of the array. The grey shaded circles represent padding elements. These are used in place of undefined data elements in the source array. The padding values can be defined according to any suitable padding algorithm, such as will be well known to the skilled person (zero padding, mirror-symmetry, etc.). For example: in shifted copy array $I(x+2)$, two data elements $I(0)$ and $I(1)$ are discarded from the left-hand side of the array, and two padding data elements are added at the right-hand side (corresponding to undefined data elements $I(8)$ and $I(9)$ of the source array). Likewise, in shifted copy array $I(x-1)$, one data element $I(7)$ is discarded from the right-hand side of the array, and one padding data element is added at the left-hand side (corresponding to undefined data element $I(-1)$ of the source array).

Let us assume that a dense output array, with eight data elements is being generated. To generate the fourth output data element $O(3)$, the indexing unit retrieves the fourth data element from each of the arrays (including the source array and the shifted copy arrays). By accessing the same location in each of the shifted copy arrays, the system is able to retrieve all of the data elements in a given local area of the source array. In the example shown in FIG. 4, the gating unit 132 is provided with $I(1)$, $I(2)$, $I(3)$, $I(4)$, and $I(5)$. These are the data elements in the area of $I(3)$. From these retrieved data elements, the gating unit is able to select and/or interpolate appropriate values. For instance, if the input index for the output $O(3)$ is 1.5, and the interpolation method is bilinear interpolation, then the gating unit 132 can apply a gating coefficient of 0.5 to each of $I(1)$ and $I(2)$, and can apply a gating coefficient of 0 to each of the other retrieved data elements. This will lead to an interpolated value "$I(1.5)$" that is a weighted average of $I(1)$ and $I(2)$. In other words, the gating unit 132 is able to simultaneously select the appropriate neighbourhood $I(1)$ and $I(2)$ to use for the interpolation, and carry out the interpolation by weighting these data elements appropriately.

A more detailed description of the calculation of the gating coefficients for the case of bilinear interpolation will now be described. In the present example, the calculation of the gating coefficients is structured in a way that makes it particularly well suited for implementation in NNA hardware.

Figure 3A:
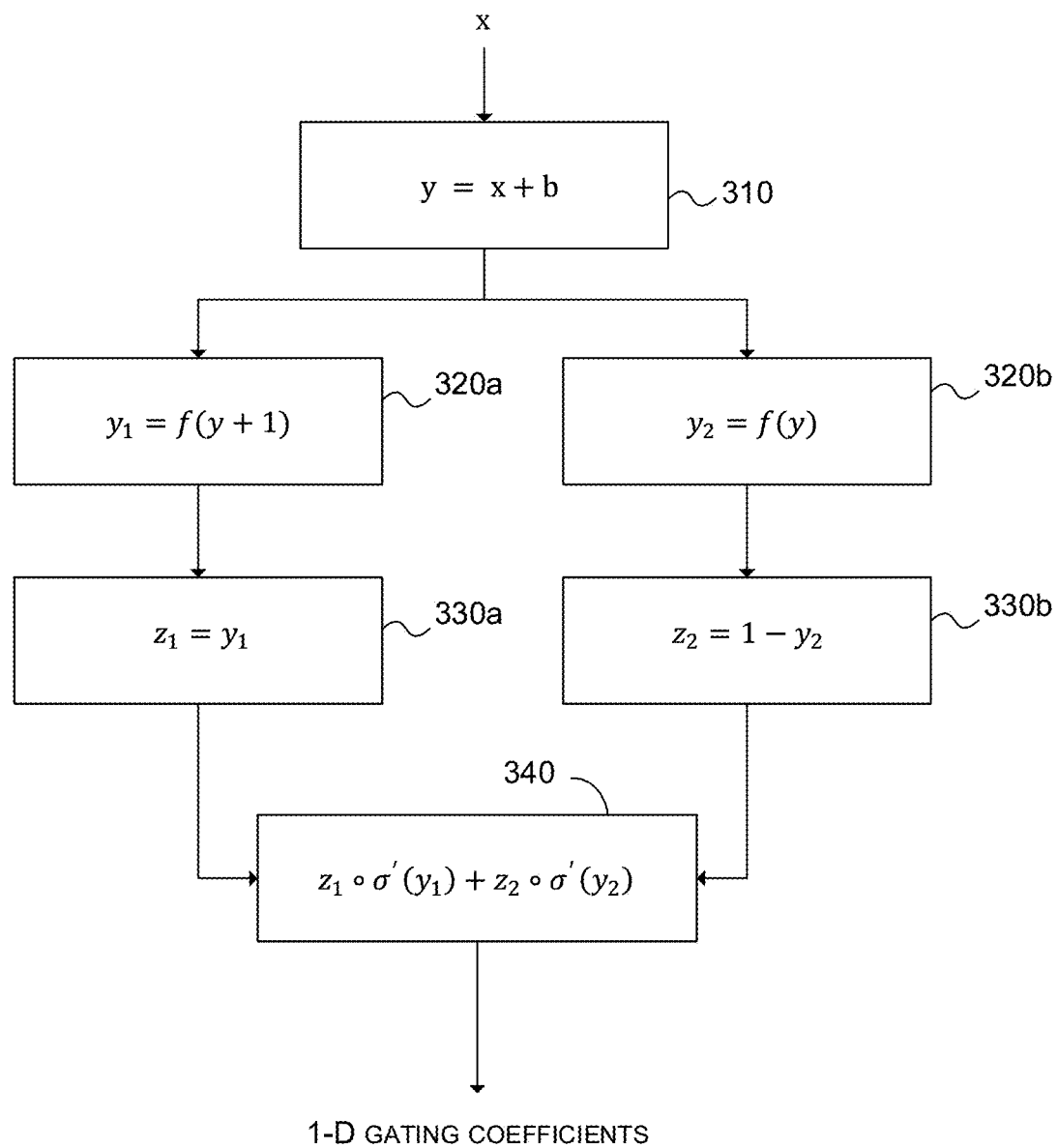
FIG. 3A illustrates a method of calculating gating coefficients for the method of FIG. 3.

The calculation of the gating coefficients for one-dimensional bilinear interpolation will first be described, with reference to FIG. 3A. This can then easily be extended to more dimensions.

Figure 5A:
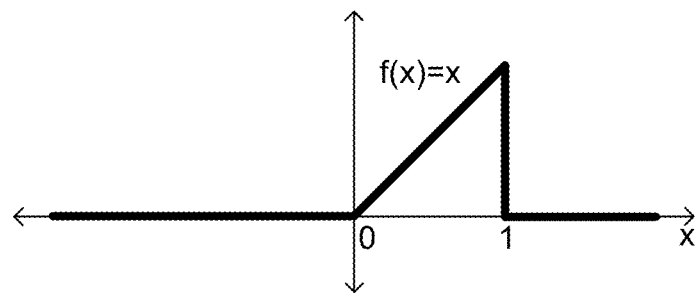
FIG. 5A shows an activation function useful for calculating gating coefficients, according to one example.

To calculate the gating values for an index $x \in \mathbb{R}^1$, in one dimension, the coefficient-calculating block 134 calculates a first summation (step 310) of the form $y=x+b$, $b \in \mathbb{R}^s$ where $b=[n, n-1, \ldots, 0, \ldots, -n+1, -n]$, $$n = \left\lceil \frac{S-1}{2} \right\rceil$$

and S is the number of shifts in the one dimension. The following activation function is then defined: $f(x)=\max(0, \text{sign}(-x+1+\varepsilon))\max(0, x)$ where $\varepsilon$ is the smallest positive number that the hardware can represent. This activation function is a non-linear function. Effectively, it returns the input value x, when x is between zero and one. For values of x outside the range 0 to 1, the activation function returns zero. This activation function is illustrated in FIG. 5A. As will be understood by those skilled in the art, the hardware of an NNA will typically include hardware for efficiently implementing activation functions.

The activation function is applied twice (for linear interpolation in one dimension). These two applications will be referred to below as "streams". One gating coefficient will be calculated by each stream. For nearest neighbour interpolation, there would be just a single stream. For bilinear interpolation (as discussed further below), there would be four streams.

In the first stream, the activation function is applied (step 320a) to the input $(y+1)$. That is, the first stream returns $y_1 = f(y+1)$. In the second stream, the activation function is applied (step 320b) to the input y. That is, the second stream returns $y_2 = f(y)$.

Next, the coefficient-calculating block 134 calculates a summation 330a, which returns $z_1 = w_1 y_1 + b_1$, where $w_1 = 1$ and $b_1 = 0$; and a further summation 330b, which returns $z_2 = w_2 y_2 + b_2$, where $w_2 = -1$ and $b_2 = 1$.

Note that, in the example above, x is a scalar value, and b is a vector. Therefore, the first summation 310 may be implemented using element-wise addition. The additional summations 330a, 330b could in principle also be implemented by element-wise addition; however, since only one element of $y_1$ and one element of $y_2$ is nonzero, the task could be reduced to a scalar summation. Additionally, since one summation 330a returns $z_1 = y_1$, it could be implemented without an actual summation operation. In the present example, however, all of the summations are carried out in full vector form. This is done for reasons of symmetry, and also because it may be advantageous when the method is implemented using NNA hardware.

At this point, $z_1$ contains one of the gating coefficients for one-dimensional linear interpolation; and $y_2$ contains the other. The remaining steps carried out by the coefficient-calculating block 134 aim to select and combine the relevant values from these vectors. The values are combined (step 340) using a calculation of the form $z_1 \circ \sigma'(y_1) + z_2 \circ \sigma'(y_2)$. Here, $\sigma' = 1 - \sigma$, where $\sigma$ is a function that returns 1 if the input is 0, and otherwise returns 0 (for example, the Dirac delta function). Consequently, the function $\sigma'$ returns the value 0 when the input is 0, and otherwise returns 1. The symbol $\circ$ denotes elementwise multiplication between its two operands.

The result of these calculations is a vector of gating coefficients, which are provided to the inner product block 136. The inner product block 136 calculates the inner product of the vector of gating coefficients with the vector of data elements retrieved from the shifted copy arrays 114.

It may be instructive to consider two simple numerical examples, applying the above calculations. In both examples, the number of shifts is $S=3$, and $b=[1,0,-1]$.

In Example A, assume that the input index $x=-0.62$. We then have: $y=[0.38,-0.62,-1.62]$; then $y_1=[0,0.38,0]$; and $y_2=[0.38,0,0]$; $z_1=[0,0.38,0]$; and $z_2=[0.62,1,1]$. Finally, $\sigma'(y_1)=[0,1,0]$ and $\sigma'(y_2)=[1,0,0]$ and $z_1\sigma'(y_1)+z_2\sigma'(y_2)=[0, 0.38,0]\circ[0,1,0]+[0.62,1,1]\circ[1,0,0]=[0.62,0.38,0]$.

In Example B, the index $x=0.24$. We then have: $y=[1.24, 0.24,-0.76]$; then $y_1=[0,0,0.24]$; and $y_2=[0,0.24,0]$; $z_1=[0,0, 0.24]$; and $z_2=[1,0.76,1]$. Finally, $\sigma'(y_1)=[0,0,1]$ and $\sigma'(y_2)=[0,1,0]$ and $z_1\sigma'(y_1)+z_2\sigma'(y_2)=[0,0, 0.24]\circ[0,0,1]+[1, 0.76,1]\circ[0,1,0]=[0,0.76,0.24]$.

As can be seen from these examples, the gating coefficients are calculated to correctly implement linear interpolation in one dimension. For bilinear interpolation (for example in two dimensions), the gating coefficients can be calculated from an outer product of the respective vectors of gating coefficients for the individual dimensions.

It will be understood that the sequence of calculations set out above is just one way to correctly calculate the gating coefficients for the linear or bilinear interpolation. They could equally be calculated by alternative sequences of operations. Nevertheless, it is believed that the above sequence may be particularly amenable to implementation on NNA hardware, since the calculations are structured principally in the form of linear summations and non-linear activation functions. NNA hardware is typically well adapted and specialised at performing such operations.

Figure 5B:
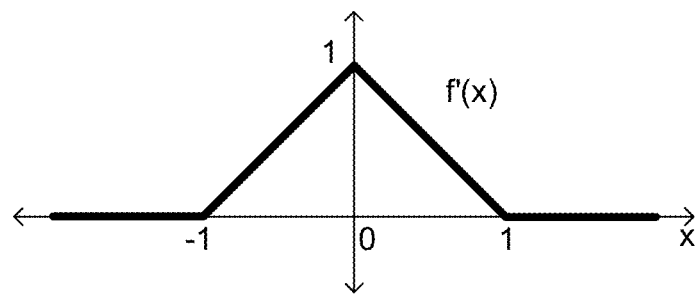
FIG. 5B shows an activation function useful for calculating gating coefficients, according to another example.

FIG. 5B shows an example of another activation function f'(x) that can be used in an alternative implementation of bilinear interpolation. This activation function replaces the blocks 320a, 320b, 330a, 330b, and 340 of FIG. 3A with a single block, which implements a triangle activation function. In other words, the number of blocks can be reduced at the expense of a slightly more complex activation function. Mathematically, the triangular activation function can be defined as f'(x)=max(0,1−|x|). This can be implemented by means of a Look-Up Table (LUT). One advantage of implementing the activation function using a LUT is that it may make it easier to reconfigure the interpolation in software.

A general framework for implementing (bilinear) interpolation in an NNA will now be described. The equations are cast in terms of a warping operation, where a dense motion field is used to warp a target frame towards a reference frame.

A motion field describes how pixels move from a reference frame, $I_R(x, y)$, to a target frame, $I_T(x, y)$, and is composed of horizontal and vertical displacements respectively denoted by $U(x, y)$ and $V(x, y)$. Warping means to calculate $I_T(X+U, Y+V)$. Based on the technique proposed by Jaderberg et al. (Max Jaderberg, Karen Simonyan, Andrew Zisserman, Koray Kavukcuoglu, "Spatial Transformer Networks", Advances in Neural Information Processing Systems 28 (NIPS 2015)), the warped version of the target frame, $I_T^w$, based on a dense motion field can be calculated through the following equation:

$$I_T^w = \sum_m^W \sum_n^H I_T(m, n) \max(0, 1 - |x^s - m|) \max(0, 1 - |y^s - n|)$$

Where $X^s = X+U, Y^s = Y+V$. This formula suggests that the warp operation is composed of indexing, $I_T(m,n)$, and bi-linear interpolation operations, $\max(0, 1-|x^s-m|)\max(0, 1-|y^s-n|)$. In other words, $$I_T^w = (1-\alpha)(1-\beta)I_T(\lfloor X^s \rfloor, \lfloor Y^s \rfloor) + \alpha(1-\alpha)\beta I_T(\lfloor X^s \rfloor, \lceil Y^s \rceil) + \alpha(1-\beta)I_T(\lceil X^s \rceil, \lfloor Y^s \rfloor) + \alpha\beta I_T(\lceil X^s \rceil, \lceil Y^s \rceil)$$

Where $\alpha = X^s - \lfloor X^s \rfloor$ and $\beta = Y^s - \lfloor Y^s \rfloor$.

In the following, the warping approach will first be described in a one-dimensional case and then expanded to a more general two-dimensional case. Based on the equation above, defining $I_T^w$, in the case of a one-dimensional discrete signal, $I_T(Z), z \in \mathbb{Z}$, $$I_T^w = \alpha I_T(\lceil X^s \rceil) + (1-\alpha)I_T(\lfloor X^s \rfloor), \forall X^s \in \mathbb{R}$$

This formula can be rewritten as the dot product of two vectors A and $I_T$, $$I_T^w = [\alpha(1-\alpha)] \cdot [I_T(\lceil X^s \rceil) I_T(\lfloor X^s \rfloor)] = A \cdot I_T$$

As discussed previously above, $I_T^w$ can be calculated by convolving the input signal with a set of sparse ("one-hot") filters, whose all entries are zero except one, to provide a set of shifted versions of the signal. The extent of these shifts can be defined by the user over a predefined area, denoted by M as the number of shifts.

The vector A represents the gating coefficients, and can be implemented by hardware equivalent to two layers of Perceptron, which, given $X^s$, calculate A. In the first layer each unit $m_i$ calculates $\alpha = x^s - m_i$ if $m_i \leq x^s < m_{i+1}$, otherwise 0. In the second layer, $\alpha$ is then passed from a function $y(x)=1-x$ to calculate $1-\alpha$ that is used in the aforementioned equation. In this way, each unit $m_{i+1}$ calculates $1-\alpha$ if $m_i \leq x^s < m_{i+1}$. For each input, only one unit of each of these two layers calculates a non-zero value.

The activation function of the Perceptrons, as discussed previously above, is defined as follows:

$$y = \begin{cases} x & \text{if } 0 \leq x < 1 \\ 0 & \text{if otherwise} \end{cases}$$

A is calculated by adding the output of the two Perceptrons.

This one-dimensional linear interpolation scheme is straightforward to extend to two dimensions. The gating coefficient matrix can be calculated from the outer product of $A_U$, calculated from U, and $A_V$, calculated from V:

$$A = A_U \otimes A_V$$

The shifted copies I can be generated in a similar fashion to the one-dimensional case, but with the shifts now over a uniform two-dimensional grid.

Figure 6:
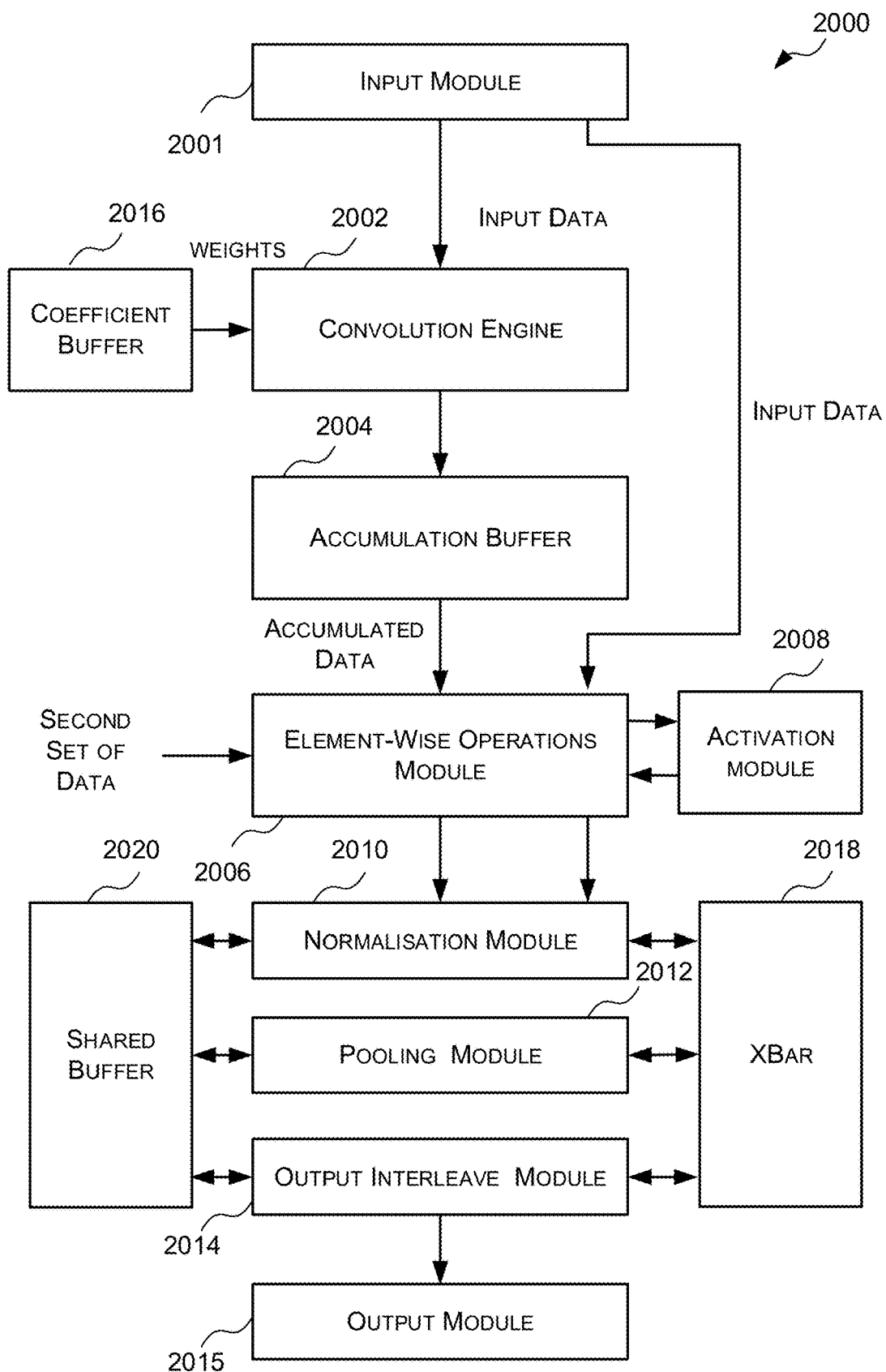
FIG. 6 is a block diagram of an exemplary NNA, on which a method of indexing and/or interpolation can be implemented.

Reference is now made to FIG. 6, which illustrates an example Neural Network Accelerator (NNA) 2000, which may be configured to implement a method of indexing according to one of the examples set out above.

The NNA 2000 of FIG. 6 is configured to compute the output of a Deep Neural Network (DNN) through a series of hardware passes (which also may be referred to as processing passes). During each pass, the hardware implementation receives at least a portion of the input data for a layer of the DNN and processes the received input data in accordance with that layer (and optionally in accordance with one or more subsequent layers) to produce processed data. The processed data is either output to memory for use as input data for a subsequent hardware pass or output as the output of the DNN. The number of layers that the hardware implementation can process during a single hardware pass may be based on the size of the data, the hardware implementation and the order of the layers. For example, where the hardware implementation comprises hardware to perform each of the possible layer types a DNN that comprises a first convolution layer, a first activation layer, a second convolution layer, a second activation layer, and a pooling layer may be able to receive the initial DNN input data and process that input data according to the first convolution layer and the first activation layer in the first hardware pass and then output the output of the activation layer into memory, then in a second hardware pass receive that data from memory as the input and process that data according to the second convolution layer, the second activation layer, and the pooling layer to produce the output data for the DNN.

The example NNA 2000 of FIG. 6 comprises an input module 2001, a convolution engine 2002, an accumulation buffer 2004, an element-wise operations module 2006, an activation module 2008, a normalisation module 2010, a pooling module 2012, an output interleave module 2014 and an output module 2015. Each module or engine implements or processes all or a portion of one or more types of layers. Specifically, together the convolution engine 2002 and the accumulation buffer 2004 implement or process a convolution layer or a fully connected layer. The activation module 2006 processes or implements an activation layer. The normalisation module 2010 processes or implements a normalisation layer. The pooling module 2012 implements a pooling layer and the output interleave module 2014 processes or implements an interleave layer. The input module 2001 is configured to receive the input data for the current hardware pass and provide it to a downstream module for processing. The downstream module that receives the input data depends on the layers that are to be processed in the current hardware pass.

The convolution engine 2002 is configured to perform a convolution operation on the received input data using the weights associated with a particular convolution layer. The weights for each convolution layer of the DNN may be stored in a coefficient buffer 2016 as shown in FIG. 6, and the weights for a particular convolution layer may be provided to the convolution engine 2002 when that particular convolution layer is being processed by the convolution engine 2002. If the hardware implementation supports variable weight formats, the convolution engine 2002 may be configured to receive information indicating the format or formats of the weights of the current convolution layer being processed to allow the convolution engine 2002 to properly interpret and process the received weights.

The convolution engine 2002 may comprise a plurality of multipliers (for example, 128 multipliers) and a plurality of adders which add the result of the multipliers to produce a single sum. Although a single convolution engine 2002 is shown in FIG. 6, in other examples there may be multiple (for example, 8) convolution engines, so that multiple windows can be processed simultaneously.

The convolution engine is specialised at performing sum-of-products calculations. Therefore, it can be used to calculate the inner product between the data elements and the vector of gating coefficients (inner product block 136 in FIG. 1). It can also be used to implement the linear summations involved in calculating the gating coefficients (coefficient-calculation block 134 in FIG. 1).

The output of the convolution engine 2002 is fed to the accumulation buffer 2004. The accumulation buffer 2004 is configured to receive the output of the convolution engine and add it to the current contents of the accumulation buffer 2004. In this manner, the accumulation buffer 2004 accumulates the results of the convolution engine 2002. Although a single accumulation buffer 2004 is shown in FIG. 6, in other examples there may be multiple (for example, 8, one per convolution engine) accumulation buffers. The accumulation buffer 2004 outputs the accumulated result to the element-wise operations module 2006 which may or may not operate on the accumulated result depending on whether an element-wise layer is to be processed during the current hardware pass.

The element-wise operations module 2006 is configured to receive either the input data for the current hardware pass (for example, when a convolution layer is not processed in the current hardware pass) or the accumulated result from the accumulation buffer 2004 (for example, when a convolution layer is processed in the current hardware pass). The element-wise operations module 2006 may either process the received input data or pass the received input data to another module (for example, the activation module 2008 and/or or the normalisation module 2010) depending on whether an element-wise layer is processed in the current hardware pass and/or depending on whether an activation layer is to be processed prior to an element-wise layer. When the element-wise operations module 2006 is configured to process the received input data, the element-wise operations module 2006 performs an element-wise operation on the received data (optionally with another data set, which may be obtained from external memory). The element-wise operations module 2006 may be configured to perform any suitable element-wise operation such as, but not limited to: add, multiply, maximum, and minimum. The element-wise operation may comprise an algebraic operation between a scalar value and each value in a vector (or matrix or tensor). The same algebraic operation is performed for each element of the vector/matrix/tensor. For example, the result of the element-wise addition between the scalar value [a] and the vector [b c d] is the vector [a+b a+c a+d]. The element-wise operations module 2006 may be configured to perform element-wise addition to implement the first summation 310 of FIG. 3A, for example. The result of the element-wise operation is then provided to either the activation module 2008 or the normalisation module 2010 depending on whether an activation layer is to be processed subsequent the element-wise layer or not.

The activation module 2008 is configured to receive one of the following as input data: the original input to the hardware pass (via the element-wise operations module 2006) (for example, when a convolution layer is not processed in the current hardware pass); the accumulated data (via the element-wise operations module 2006) (for example, when a convolution layer is not processed in the current hardware pass and either an element-wise layer is not processed in the current hardware pass or an element-wise layer is processed in the current hardware pass but follows an activation layer). The activation module 2008 is configured to apply an activation function to the input data and provide the output data back to the element-wise operations module 2006 where it is forwarded to the normalisation module 2010 directly or after the element-wise operations module 2006 processes it. In some cases, the activation function that is applied to the data received by the activation module 2008 may vary per activation layer. In these cases, information specifying one or more properties of an activation function to be applied for each activation layer may be stored (for example, in memory) and the relevant information for the activation layer processed in a particular hardware pass may be provided to the activation module 2008 during that hardware pass.

The use of an activation function in the calculation of the gating coefficients has already been described above. In some cases, the activation module 2008 may be configured to store, in entries of a lookup table, data representing the activation function. In these cases, the input data may be used to lookup one or more entries in the lookup table and output values representing the output of the activation function. For example, the activation module 2008 may be configured to calculate the output value by interpolating between two or more entries read from the lookup table.

The normalisation module 2010 is configured to receive one of the following as input data: the original input data for the hardware pass (via the element-wise operations module 2006) (for example, when a convolution layer is not processed in the current hardware pass and neither an element-wise layer nor an activation layer is processed in the current hardware pass); the accumulated data (via the element-wise operations module 2006) (for example, when a convolution layer is processed in the current hardware pass and neither an element-wise layer nor an activation layer is processed in the current hardware pass); and the output data of the element-wise operations module and/or the activation module. The normalisation module 2010 then performs a normalisation function on the received input data to produce normalised data. In some cases, the normalisation module 2010 may be configured to perform a Local Response Normalisation (LRN) Function and/or a Local Contrast Normalisation (LCN) Function. However, it will be evident to a person of skill in the art that these are examples only and that the normalisation module 2010 may be configured to implement any suitable normalisation function or functions. Different normalisation layers may be configured to apply different normalisation functions.

The pooling module 2012 may receive the normalised data from the normalisation module 2010 or may receive the input data to the normalisation module 2010 via the normalisation module 2010. In some cases, data may be transferred between the normalisation module 2010 and the pooling module 2012 via an XBar 2018. The term "XBar" is used herein to refer to a simple hardware module that contains routing logic which connects multiple modules together in a dynamic fashion. In this example, the XBar may dynamically connect the normalisation module 2010, the pooling module 2012 and/or the output interleave module 2014 depending on which layers will be processed in the current hardware pass. Accordingly, the XBar may receive information in each hardware pass indicating which modules 2010, 2012, 2014 are to be connected.

The pooling module 2012 is configured to perform a pooling function, such as, but not limited to, a max or mean function, on the received data to produce pooled data. The purpose of a pooling layer is to reduce the spatial size of the representation to reduce the number of parameters and computation in the network, and hence to also control overfitting. In some examples, the pooling operation is performed over a sliding window that is defined per pooling layer. The output interleave module 2014 may receive the normalised data from the normalisation module 2010, the input data to the normalisation function (via the normalisation module 2010), or the pooled data from the pooling module 2012. In some cases, the data may be transferred between the normalisation module 2010, the pooling module 2012 the output interleave module 2014 via an XBar 2018. The output interleave module 2014 is configured to perform a rearrangement operation to produce data that is in a predetermined order. This may comprise sorting and/or transposing the received data. The data generated by the last of the layers is provided to the output module 2015 where it is converted to the desired output format for the current hardware pass.

The normalisation module 2010, the pooling module 2012, and the output interleave module 2014 may each have access to a shared buffer 2020 which can be used by these modules 2010, 2012 and 2014 to write data to and retrieve data from. For example, the shared buffer 2020 may be used by these modules 2010, 2012, 2014 to rearrange the order of the received data or the generated data. For example, one or more of these modules 2010, 2012, 2014 may be configured to write data to the shared buffer 2020 and read the same data out in a different order. In some cases, although each of the normalisation module 2010, the pooling module 2012 and the output interleave module 2014 have access to the shared buffer 2020, each of the normalisation module 2010, the pooling module 2012 and the output interleave module 2014 may be allotted a portion of the shared buffer 2020 which only they can access. In these cases, each of the normalisation module 2010, the pooling module 2012 and the output interleave module 2014 may only be able to read data out of the shared buffer 2020 that they have written in to the shared buffer 2020.

As described above the modules of the hardware implementation 2000 that are used or active during any hardware pass are based on the layers that are processed during that hardware pass. In particular, only the modules or components related to the layers processed during the current hardware pass are used or active. As described above, the layers that are processed during a particular hardware pass is determined (typically in advance, by, for example, a software tool) based on the order of the layers in the DNN and optionally one or more other factors (such as the size of the data). For example, in some cases the hardware implementation may be configured to perform the processing of a single layer per hardware pass unless multiple layers can be processed without writing data to memory between layers. For example, if a first convolution layer is immediately followed by a second convolution layer, each of the convolution layers would have to be performed in a separate hardware pass as the output data from the first convolution layer needs to be written out to memory before it can be used as an input to the second convolution layer. In each of these hardware passes, only the modules, components or engines relevant to a convolution layer, such as the convolution engine 2002 and the accumulation buffer 2004, may be used or are active.

As will by now be apparent, various modifications of the foregoing examples are possible. Although the hardware implementation 2000 of FIG. 6 illustrates a particular order in which the modules, engines etc. are arranged and thus how the processing of data flows through the processing module, it will be appreciated that this is an example only and that in other examples the modules, engines etc. may be arranged in a different manner. Furthermore, other NNAs may support additional or alternative types of neural network layers and thus may comprise different modules, engines etc.

Although the foregoing description has concentrated on linear and bilinear interpolation by way of example, other methods of interpolation may be implemented according to other examples. In particular, by choosing different neighbourhoods around the target location that is indexed, and calculating different gating coefficients, other types of interpolation may be provided. For nearest neighbour interpolation, the neighbourhood will consist of a single data element, and the gating coefficients will be equal to 0, except for this data element (for which the gating coefficient will be equal to 1). For linear interpolation in one dimension, the neighbourhood consists of two data elements. For bilinear interpolation in two dimensions, the neighbourhood consists of four data elements (2×2). For higher-order interpolation (for example, for bicubic interpolation), the neighbourhood may be larger. The interpolation kernels for various types of conventional interpolation will be well known to those skilled in the art. Likewise, the approach described in the examples above will, in general, be applicable to interpolation kernels still to be developed in the future.

It is noted that the foregoing description concentrated on indices that were provided in relative form—that is, as offsets in an area around a central data element. However, as will be understood by those skilled in the art, the indices can equivalently be provided in absolute form, with suitable reformulation of the equations.

Figure 7:
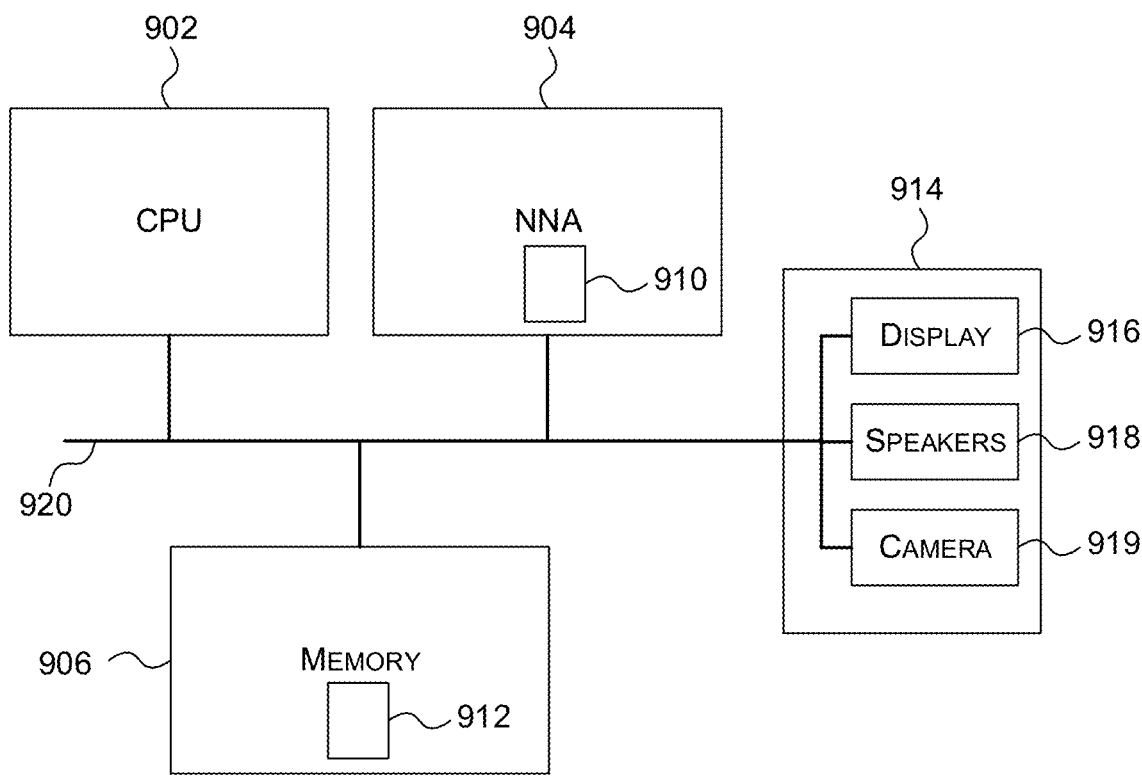
FIG. 7 shows a computer system in which a processing system according to an example is implemented.

FIG. 7 shows a computer system in which the processing systems described herein may be implemented. The computer system comprises a CPU 902, a NNA 904, a memory 906 and other devices 914, such as a display 916, speakers 918 and a camera 919. A processing block 910 (corresponding to processing block 100) is implemented on the NNA 904. In other examples, the processing block 910 may be implemented on the CPU 902. The components of the computer system can communicate with each other via a communications bus 920. A store 912 (corresponding to memory 110) is implemented as part of the memory 906.

The processing system of FIG. 1 is shown as comprising a number of functional blocks. This is schematic only and is not intended to define a strict division between different logic elements of such entities. Each functional block may be provided in any suitable manner. It is to be understood that intermediate values described herein as being formed by a processing system need not be physically generated by the processing system at any point and may merely represent logical values which conveniently describe the processing performed by the processing system between its input and output.

The processing systems described herein may be embodied in hardware on an integrated circuit. The processing systems described herein may be configured to perform any of the methods described herein. Generally, any of the functions, methods, techniques or components described above can be implemented in software, firmware, hardware (for example, fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, NNA, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed (i.e. run) in an integrated circuit manufacturing system configures the system to manufacture a processing system configured to perform any of the methods described herein, or to manufacture a processing system comprising any apparatus described herein. An integrated circuit definition dataset may be, for example, an integrated circuit description.

Therefore, there may be provided a method of manufacturing, at an integrated circuit manufacturing system, a processing system as described herein. Furthermore, there may be provided an integrated circuit definition dataset that, when processed in an integrated circuit manufacturing system, causes the method of manufacturing a processing system to be performed.

An integrated circuit definition dataset may be in the form of computer code, for example as a netlist, code for configuring a programmable chip, as a hardware description language defining hardware suitable for manufacture in an integrated circuit at any level, including as register transfer level (RTL) code, as high-level circuit representations such as Verilog or VHDL, and as low-level circuit representations such as OASIS (RTM) and GDSII. Higher level representations which logically define hardware suitable for manufacture in an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (for example, providing commands, variables etc.) may be required in order for a computer system configured for generating a manufacturing definition of an integrated circuit to execute code defining an integrated circuit so as to generate the manufacturing definition of that integrated circuit.

Figure 8:
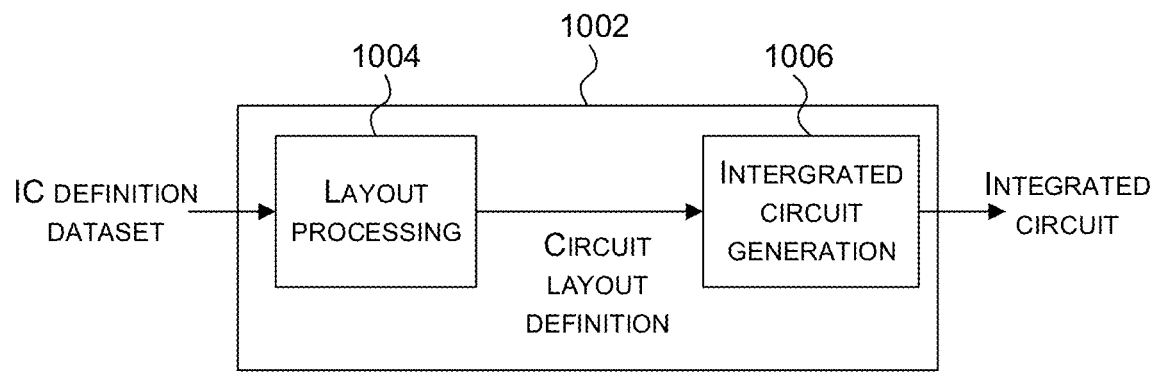
FIG. 8 shows an integrated circuit manufacturing system for generating an integrated circuit embodying a processing system.

An example of processing an integrated circuit definition dataset at an integrated circuit manufacturing system so as to configure the system to manufacture a processing system will now be described with respect to FIG. 8. FIG. 8 shows an example of an integrated circuit (IC) manufacturing system 1002 which is configured to manufacture a processing system as described in any of the examples herein. In particular, the IC manufacturing system 1002 comprises a layout processing system 1004 and an integrated circuit generation system 1006. The IC manufacturing system 1002 is configured to receive an IC definition dataset (e.g. defining a processing system as described in any of the examples herein), process the IC definition dataset, and generate an IC according to the IC definition dataset (e.g. which embodies a processing system as described in any of the examples herein). The processing of the IC definition dataset configures the IC manufacturing system 1002 to manufacture an integrated circuit embodying a processing system as described in any of the examples herein.

The layout processing system 1004 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 1004 has determined the circuit layout it may output a circuit layout definition to the IC generation system 1006. A circuit layout definition may be, for example, a circuit layout description. The IC generation system 1006 generates an IC according to the circuit layout definition, as is known in the art. For example, the IC generation system 1006 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 1006 may be in the form of computer-readable code which the IC generation system 1006 can use to form a suitable mask for use in generating an IC.

The different processes performed by the IC manufacturing system 1002 may be implemented all in one location, e.g. by one party. Alternatively, the IC manufacturing system 1002 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a processing system without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 8 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 8, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A hardware-implemented method of indexing data elements in a source array in a memory and interpolating between the data elements, the method comprising:
   generating a plurality of shifted copy arrays based on the source array, each shifted copy array comprising the data elements of the source array at a respective shifted position;
   receiving a plurality of indices for indexing the source array, each index of the plurality of indices indicating a target location in the source array; and
   for each index of the plurality of indices:
   retrieving a data element from each of the shifted copy arrays; and
   gating the retrieved elements based on the index, to thereby generate an interpolated data element from the retrieved data elements.

2. The method of claim 1, wherein generating the shifted copy arrays comprises convolving the source array with a set of filter kernels, each filter kernel generating a respective one of the shifted copy arrays.

3. The method of claim 1, wherein gating the retrieved elements comprises defining a gating coefficient for each of the retrieved elements, wherein the gating coefficients for data elements other than neighbourhood data elements in a finite neighbourhood around the target location are zero.

4. The method of claim 3, wherein the gating comprises multiplying the retrieved data elements by their respective gating coefficients, and summing the results.

5. The method of claim 3, wherein defining the gating coefficients comprises calculating the gating coefficients, wherein the calculating comprises a linear summation, followed by a nonlinear activation function.

6. The method of claim 5, wherein calculating the gating coefficients comprises, for an index $z \in \mathbb{R}^1$ of the plurality of indices, in one dimension:

a first summation of the form $y=x+b$, $b \in \mathbb{R}^s$, where $b=[n, n-1, \ldots, 0, \ldots, -n+1, -n]$, $$n = \left\lceil \frac{S-1}{2} \right\rceil$$

and S is the number of shifts in the one dimension;
defining an activation function, which returns the value input to it, if that input value is between 0 and 1, and otherwise returns 0;
a first operation of the activation function, with the input $(y+1)$, giving an output $y_1$;
a second operation of the activation function, with the input $(y)$, giving an output 32; and
a second summation, operating on at least one value of 3/2, which returns $z_2 = w_2 y_2 + b_2$, where $w_2 = -1$ and $b_2 = 1$, wherein the gating coefficients are based on the result 1 of the first operation of the activation function and the result $z_2$ of the second summation.

7. The method of claim 6, wherein the shifted positions comprise shifted positions in multiple dimensions and each index is an index $x \in \mathbb{R}^N$ in respective multiple dimensions, and
wherein calculating the gating coefficients comprises repeating said calculating said gating coefficients for each dimension of the multiple dimensions, and calculating an outer product of the results.

8. The method of claim 3, wherein the gating coefficient for at least one of the retrieved data elements is a floating point value.

9. The method of claim 1, wherein the plurality of indices includes floating point indices.

10. The method of claim 1, wherein the interpolating comprises linear or bilinear interpolation, or bicubic interpolation.

11. The method of claim 1, used in a method of warping an image or feature map based on a motion vector field.

12. The method of claim 1, wherein the method is implemented by hardware logic adapted to implement a neural network.

13. A processing system comprising a memory and hardware for indexing data elements in a source array in the memory and interpolating between the data elements, the system comprising:
a shift-generator block, configured to generate a plurality of shifted copy arrays based on the source array, each shifted copy array comprising the data elements of the source array at a respective shifted position; and
an indexing block, configured to receive a plurality of indices for indexing the source array, each index of the plurality of indices indicating a target position in the source array; and
for each index of the plurality of indices:
retrieve a data element from each of the shifted copy arrays;
wherein the indexing block comprises a gating unit configured to gate the retrieved elements to thereby generate an interpolated data element from the retrieved data elements.

14. The processing system of claim 13, wherein the shift-generator block comprises a plurality of digital filters, wherein each digital filter is configured to generate a respective one of the shifted copy arrays, by convolving the source array with a respective filter kernel.

15. The processing system of claim 13, wherein the processing system is embodied in hardware on an integrated circuit.

16. A non-transitory computer readable storage medium having stored thereon computer readable code configured to cause to be performed, when the code is run on at least one processor, a method of indexing data elements in a source array in a memory and interpolating between the data elements, the method comprising:
generating a plurality of shifted copy arrays based on the source array, each shifted copy array comprising the data elements of the source array at a respective shifted position;
receiving a plurality of indices for indexing the source array, each index of the plurality of indices indicating a target location in the source array; and
for each index of the plurality of indices:
retrieving a data element from each of the shifted copy arrays; and
gating the retrieved elements based on the index, to thereby generate an interpolated data element from the retrieved data elements.

17. A non-transitory computer readable storage medium having stored thereon an integrated circuit definition dataset that, when processed in an integrated circuit manufacturing system, configures the integrated circuit manufacturing system to manufacture a processing system as claimed in claim 13.

* * * * *